Dec. 29, 1959 N. R. WAHLBERG 2,919,185
METHOD OF OPERATING A GAS GENERATING SHAFT FURNACE AS A
GAS GENERATOR, BLAST FURNACE OR CUPOLA, AND A
FURNACE FOR CARRYING THE METHOD INTO EFFECT
Filed July 15, 1957
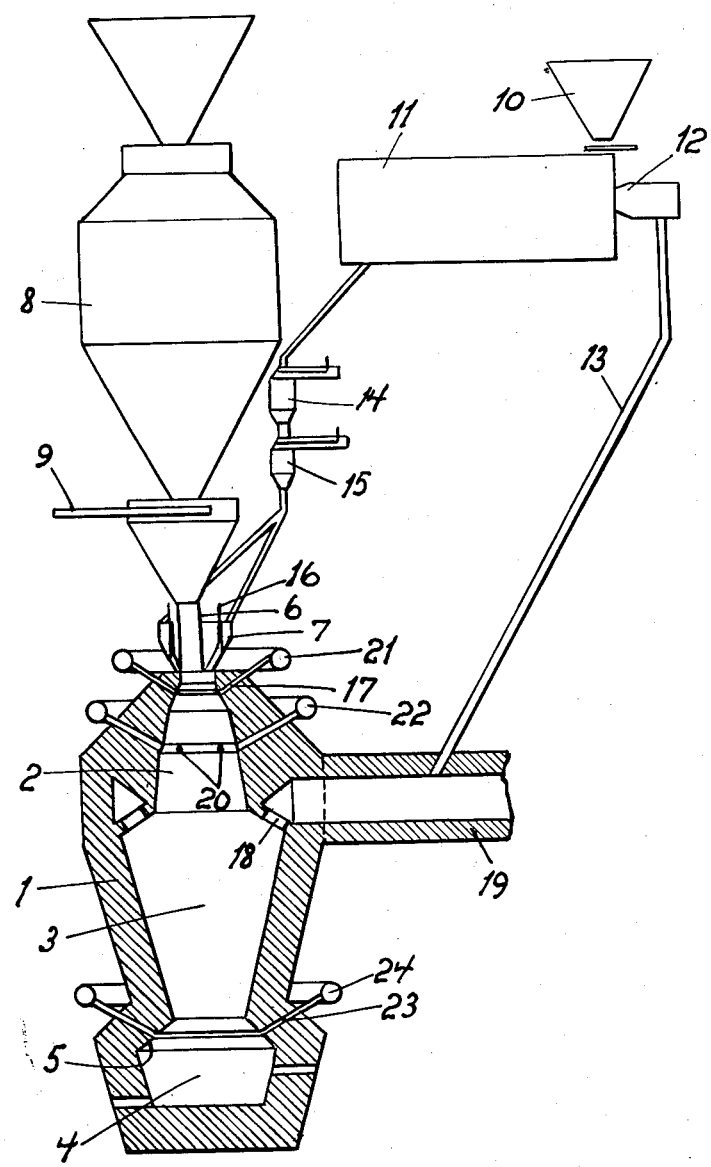

United States Patent Office 2,919,185
Patented Dec. 29, 1959

2,919,185

METHOD OF OPERATING A GAS GENERATING SHAFT FURNACE AS A GAS GENERATOR, BLAST FURNACE OR CUPOLA, AND A FURNACE FOR CARRYING THE METHOD INTO EFFECT

Nils Rune Wahlberg, Eskilstuna, Sweden, assignor to Axel Arne Severin, Eskilstuna, Sweden Application July 15, 1957, Serial No. 671,755

18 Claims. (Cl. 75—42)

The present invention relates to a method of operating a gas generating shaft furnace as a gas generator, blast furnace or cupola, and a furnace suited to this purpose.

An ordinary generator, a grate generator or a melting generator ordinarily produces gas containing only about 30–35% combustible gas constituents, which gas, in addition, contains one or a few percent $H_2O$ and 4–5% $CO_2$ and leaves the generator at a temperature over about 600–700° C. Owing to the fact that a melting generator burns completely any coke produced during combustion, a melting generator is an improvement of the ordinary grate generator; nevertheless, the melting generator has the disadvantage that the coal distillation produces "wet" the gas and thereby presents the tar constituents from being withdrawn with the product gas thus forming with the soot a troublesome crust. For this reason there has been a desideratum for a long time to obtain a dry, hot gas which contains all combustible constituents of the coal.

An ordinary cupola can only be operated with coke or carbonized fuel but not with fossil fuels such as coal. Furthermore, it is only possible to operate it intermittently as oxidizing slag rapidly destroys the lining. It is true that this destruction develops less rapidly in modern hot-blast cupolas but, however, the base in the latter has merely a duration of about one week.

An ordinary blast furnace can only be operated with carbonized fuels, such as charcoal or coke. Its great height, which is required for preheating the charge and completing the reduction of the same, has made it impossible, moreover, to use unsintered ore concentrates. Trials with a so called low-shaft furnace hitherto have all been based on using the old principle of the blast furnace unchanged, but the low shaft height of the low-shaft furnace is inevitably accompanied by a strong impairment of the pipe function of the old blast furnace. The original function of the pipe was closely allied to its great height, for which reason the heating and reduction of the charge must—in a low-shaft furnace—be largely effected in the hearth zone of the latter. This will lead to the result that the temperature gradient in such a furnace will become very steep, which in turn leads to the result that the time for prereduction will become too short. Hereby crust formations are easily created, resulting in bridging, or else the hearth becomes too overloaded from having to carry through both its own normal function plus the pipe function in heating and prereducing.

By means of the method and the furnace according to the present invention one and the same furnace may be operated without changes as a generator, blast furnace or cupola while obviating the inconveniences stated for each type of furnace.

When the furnace operates as a generator its main function is to generate from carbonaceous fuels a dry generator gas with a high temperature, about 1000° C., a low content of $CO_2$, close upon 0% $CO_2+H_2O$, and a high content of combustible constituents, about 45–50% $CO+H_2$, the fuel transferring all its energy to the gas (disregarding inevitable losses).

When the furnace operates as a cupola its main function is to enable gasifying, especially fossil, fuels to be used instead of coke for the melting and to render possible a continuous operation.

When the furnace operates as a blast furnace its main function in doing so is to use coal instead of coke and more or less finely grained concentrates instead of coarse sinter and/or ore.

Hence, the invention relates to a method of operating a gas generating gas furnace as a gas generator, blast furnace or cupola, according to which a carbonaceous and tar forming material is supplied at the upper section of the furnace, air is admitted to the top of the furnace and gas formed is drawn off at a level below said top of the furnace, characterized in that hot air is admitted to the top of the furnace at at least two levels, the air then being admitted, at the upper level at least, through openings which are directed obliquely downwards and extend substantially around the whole shaft, and in that the hot air is admitted to the top of the furnace in such a quantity that the tar consitituents of the fuel are distilled off and gasified without the slag constituents sintering.

According to the invention and when being used as a gas generator, the furnace can be operated either in such a manner that air is admitted to the upper section of the furnace and the cokified fuel which is not burnt out is taken out from the lower part of the furnace by means of some suitable discharge device, for instance, a rotating disc, or be operated as a melting generator, air also being admitted to the lower section of the furnace, which part is arranged as a melting chamber, and molten cinders being taken out from the melting chamber.

According to the invention the air admitted at each level of the top of the furnace is adjusted in such a way that the temperature at any point falls below the melting-point of the cinders formed. Hereby a troublesome slag formation is avoided. The ratio between air admitted to the upper and lower level is suitably about 2 to 1. In that case where the furnace is provided with a melting chamber, 65–85% of the total air quantity supplied to the furnace is preferably admitted to the top of the furnace while the remaining 15–35% is admitted to the melting chamber.

In order to permit the air to be distributed all over the top of the furnace, in such an advantageous manner as possible, the air is preferably not admitted, on the upper level at least, through conventional twyers, which give rise to hot fierce flames, but through horizontal slots which extend substantially around the whole furnace. Also the air supplied to the melting chamber is performed through such slots.

The invention will be explained more in detail in the following with reference to the attached drawing showing, by way of example, a shaft furnace according to the invention adapted as a blast furnace.

The wall 1 of the furnace encases a shaft which has a comparatively narrow upper part or top 2 substantially in the shape of a cone with its thick end downwards. The top widens towards the widest section of the shaft at about ⅓ of the total height of the furnace as measured from the top. The part situated below the top, that is the bosh 3, tapers downwards. Under the bosh there is a melting chamber or hearth (crucible) 4 the ceiling of which is formed by a portion 5 tapering upwards.

The top portion 2 is provided at the very top with one feeding hopper 6 for coal and one feeding hopper 7 for ore concentrates. The coal is stored in a container 8 from whence it is dumped into the furnace through a damper 9. The coals enter centrally in the top 2 through the pipe 6.

The concentrates are supplied through a hopper 10 into a drying oven 11 heated by means of gas which is taken off from the furnace 1 through a conduit 13 and burnt in a burner 12. The dried concentrates are fed through locks 14 and 15 in the feeding hopper 7 provided with a damper 16, said feeding hopper surrounding the feeding pipe 6 for the fuel so that the concentrates will be fed annularly around the fuel.

Gas off-takes are disposed annularly at that place where the top 2 widens towards the bosh 3. The gas off-takes are interconnected by a gas channel 19.

Intake openings for hot air are arranged in the top of the furnace on two different levels. On the upper level the intakes are shaped like a slot 17 directed obliquely downwards, encircling the whole shaft and being positioned at a point where the top widens rather strongly downwards, immediately below the intake point for fuel and concentrates. On the lower level the intake openings are shaped as a number of twyers 20 which also are directed obliquely downwards.

Air intakes are also arranged in the conical ceiling 5 of the hearth 4. The intakes are shaped as a slot 23 directed obliquely downwards encircling the whole crucible.

The hot air is supplied to the various intakes by means of conduits 21, 22 and 24, respectively.

The furnace described operates in the following manner. Owing to the fact that the cross section of the shaft at the upper part of the top 2 widens strongly, the fuel as introduced will here obtain a free dispose surface upon which the concentrates will rest in a quantity determined by the adjustment of the damper 16. Right below this spot the furnace cross section widens at an angle of about 60° to about 3 times the diameter of the coal feeding tube, and approximately in the middle of this conical part the air intake 17 is disposed. As previously stated this air intake is an annular slot directed obliquely downwards. This slot has for its object in part to spread the air over as large a quantity of coal as possible, and in part to blow the concentrates towards the center of the shaft. As a result, the area immediately ahead of the air slot 17 will consist of pure carbon burning while generating gas, which gas will blow the concentrates towards the centre of the shaft. At the combustion of the coal, which is most intensive alongside the wall of the furnace and less intensive within the core of the coal column, the coal and the concentrates fall outwards-downwards past the air slot 17. In doing so the concentrates settle in the lee behind the burning lumps of coal and are swept by highly reducing gas. The concentrates then start being reduced and they immediately exert a tendency to agglomerate into loosely bound lumps of iron sponge. These lumps of sponge may partly fall to pieces again during the continued descending but they also receive new descending concentrates which adhere to their surface. Hence, the lumps of concentrates exert a tendency to agglomerate into larger and larger porous balls while the lumps of coal burn and thereby diminish. Thus the procedure will be that the concentrates are first blown in towards the centre of the shaft when passing the first air intake and then drawn outwards-downwards due to the fact that fuel is consumed, so that concentrates and coal are well intermixed at the same time as the concentrates, which originally are finely grained, agglomerate into larger and larger lumps. These tend to fall outwards towards the gas off-take.

The strong combustion at the air intake 17 immediately raises the temperature of the fuel and the concentrates to reaction temperature. For instance, a burning lump of coal can be heated to 1000° C. in a few minutes, whereas heating in an ordinary blast furnace requires 5–7 hours as heating there only is performed by physical heat transmission. Thus the furnace attains full activity immediately at the intake.

In order to keep down the temperature of the initial combustion, that is, the temperature of the oxidizing flame, at intake 17 the shaft has there a small diameter, that is, the comparatively cool lumps of coal fed in will quickly pass the initial combustion zone as they are rapidly consumed further down in the shaft. For maintaining the combustion the air must be preheated, preferably to 500–700° C. Also the concentrates ought to be preheated. Also without using concentrates, that is, when running the furnace as a generator or a cupola, this combustion may be varied so that the coal is either fed so slowly that the temperature at the air intake rises to about 2000° C., or so rapidly that the fire expires. For this reason the temperature can be readily adjusted to be about 1200° C., that is, well below the melting point of the slag.

Hence, in order to prevent the development of an unduly high temperature in the top portion of the charge column a certain minimum rate in feeding the coal is required. It is true that the gaseous constituents of the fuel have a retaining effect on the temperature when they are distilled, but in spite of this the temperature will rise if the fuel feeding rate is not high enough.

Therefore the fuel must be fed past the air intake 17 in a quantity that is larger than what corresponds to the fuel consumption in the hearth 4. For this reason still one or more air intakes 20, preferably water cooled, are arranged below the air intake 17. These intakes, which may be arranged as conventional twyers, have for their object, by blowing in air, in part to distribute the heat towards the centre of the shaft, in part to burn still more coal for obtaining a quicker feed past the air intake 17. The reason why the blowing in of air through intakes 20 can contribute to spreading the flame towards the centre of the shaft is that the air blown in primarily burns the gas arriving from the top and, secondarily, burns solid fuel. Owing to the fact that the flame from the intakes 20 thus extends over a larger volume of coal its temperature is kept down. If the intakes 20 would not exist, the feeding of the fuel should become slower, the temperature at the intake 17 would rise, cinders formed would melt and a slag zone would develop below the intake 17. By means of the intakes 20 the heat is distributed both horizontally and vertically and a better gas composition and a more even distribution of the cinders is obtained. Moreover, at the intakes 20 the fuel is most intensively burnt at the wall of the furnace and the travel of the fuel outwards-downwards is emphasized in such a manner that the iron sponge spreads well over the whole cross section of the furnace. By reason of these conditions, the volume of the fuel is decreased and the volume of the sponge is increased which causes the sponge to fall outwards towards the periphery when the gas off-takes 18 are reached. At the gas off-takes the previous rapid passage downwards of the charge is reduced due to the great width of the shaft. By this increase of the shaft area there is attained partly an increased final reduction time for the sponge, which is desirable as the reduction runs considerably slower after about 70–80% of the ore oxygen has escaped, partly a slow speed of the gas out to the gas off-takes 18, which means that the gas arriving at a high speed from the top of the furnace when it diverts in order to get out through the gas off-takes at the same time will reduce its speed whereby dust particles are separated as a result of cyclone action. The gas will therefore be drawn off as pure as possible, that is, the gas offtake constitutes a first effective soot trap, the furnace benefitting by this separated soot.

In the combustion of fuel, such as coal, containing tar constituents, the rule is that the original constituent of the tars, which may be chemically designated here in a schematical way as $CH_2$, is decomposed tot: one gas constituent $CH_{(2+x)}$ and one tar constituent $CH_{(2-x)}$, the former comprising, depending on the value of $x$, the series from $H_2$ and $CH_4$ to heavy hydrocarbons and the latter comprising the series easy-flowing oils to more and more heavy tars and finally to pitch.

In addition, the coal contains a certain amount CO and C and its formula will read approximately:

$$C_m + CO_n + (CH_2)_x$$

If therefore coal is burnt with a small quantity of air, "wetting" oils or tars are formed. If the air quantity is somewhat increased, soot is formed which obstructs the furnace. However, if the air quantity is large enough a pure gas with neither tar nor soot is obtained.

The tar constituent $CH_2$ component in the coal must thus be completely burnt for a pure gas to be obtained and disturbances in the furnace operation to be avoided.

Below the top of the furnace comes the bosh 3 which receives its gas from below, that is, the sponge reduced in the top is met by pure, just formed CO-gas from the coke in the hearth and will thereby be well carburized. This takes time as the final reduction runs slowly.

Below the bosh comes the hearth or crucible ceiling 5 which forces rising gas and descending sponge to meet in the centre of the furnace. The sponge then melts and iron and sponge percolate through a hot layer of coal without coming into contact with the oxidizing part of the flame formed under the ceiling of the hearth. Hereby reoxidation of the sponge is prevented. Hereby also the sulphur refining becomes eminently effective. If the demand for an effective sulphur refining is given up, the furnace may also be designed with a bosh and crucible in accordance with the conventional blast furnace section—the fundamental function of the furnace remains the same.

The crucible is provided in the vault-shaped ceiling 5 with an annular air slot 23 so that the air, immediately upon its entrance, meets a large quantity of coal, CO then being formed. The air slot 23 is directed obliquely downwards, that is, also in this case the uniflow principle is utilized giving a more advantageous distribution of temperature between material and gas than does the counterflow principle. The strong widening of the furnace below the crucible ceiling forces the coal to stay long in the combustion zone which is necessary in order to attain a temperature required for melting the non-combustible constituents.

As the major part of the totally required air quantity is needed for the combustion in the top of the furnace the melting chamber obtains a comparatively small air quantity, normally amounting to about 30% of the air quantity supplied to the hearth of an ordinary blast furnace. The reason why this small air quantity is sufficient is that this air is only used for melting iron already fully heated and carbonized, that is, the function of the crucible is most exact to be compared with that of the cupola.

Hence, the furnace operates on the whole in such a manner that it first burns the tar of the fuel and then the coke thus formed, while an ordinary generator always burns the coke first and distills the tar afterwards.

The function of the furnace has been explained here in connection with the description of a blast furnace. In principle the furnace operates in the same way if it is run like a melting generator or a cupola. The modifications coming to the fore concerning the composition of the charge, the air quantities required etc. are completely evident to any one skilled in the art and need not be explained further here. Only that fact shall be mentioned that in operating the furnace as a blast furnace about 35 percent of the total air quantity ought to be admitted into the melting chamber while when operating the furnace as a melting generator only about 15 percent of the total air quantity need be admitted into the melting chamber.

The furnace as illustrated in the drawing is provided with a hearth in which practically all remaining carbonaceous constituents of the charge are burned. It is within the scope of the invention to omit said hearth and to withdraw from the bottom of the furnace a charge containing a considerable amount of carbonaceous material. For instance, the furnace may be charged with coal, a desired quantity of gas may be withdrawn through the gas-off takes, while the remaining carbon of the coal is withdrawn as coke from the bottom of the furnace.

What is claimed is:

1. A method of operating a gas generating shaft furnace as a gas generator, blast furnace or cupola, according to which a charge which contains a carbonaceous and tar forming fuel is supplied at the upper portion of the furnace, air is admitted to the top of the furnace and gas formed is drawn off on a level below said top of the furnace, characterized in that hot air is admitted to the top of the furnace at at least two levels, the air introduced at the upper level being introduced in the form of a plurality of streams spaced about the circumference of the furnace and directed obliquely downwardly upon a column of the charge, and that the hot air is admitted to the top of the furnace in such a quantity that the tar constituents of the fuel are distilled off and gasified without the slag constituents sintering.

2. A method according to claim 1 of operating the furnace as a melting generator, blast furnace or cupola, characterized in that air is also admitted to the lower part of the furnace, which part serves as a melting chamber, and gas formed is drawn off from the intermediate part of the furnace.

3. A method according to claim 1, characterized in that the hot air admitted on each level of the top of the furnace is adjusted in such a way that the temperature at any point falls below the melting-point of the cinders formed.

4. A method according to claim 1, characterized in that the ratio between the air quantities admitted at the upper and lower levels is substantially 2 to 1.

5. A method according to claim 1, characterized in that air is also admitted to the lower part of the furnace, which part serves as a melting chamber, and gas formed is drawn off from the intermediate part of the furnace, about 65–85% of the total air blast quantity supplied to the furnace being admitted to the top of the furnace while the remainder is admitted to the melting chamber.

6. A method according to claim 5 when operating the furnace as a generator, characterized in that about 85% of the total air blast quantity is admitted to the top of the furnace.

7. A method according to claim 1 when operating the furnace as a blast furnace, characterized in that air is also admitted to the lower part of the furnace, which part serves as a melting chamber, and gas formed is drawn off from the intermediate part of the furnace, and characterized, further, in that about 65% of the total air blast quantity is admitted to the top of the furnace.

8. A method according to claim 1, characterized in that air is also admitted to the lower part of the furnace, which part serves as a melting chamber, and gas formed is drawn off from the intermediate part of the furnace, and characterized, further, in that the air admitted to the melting chamber is introduced in the form of a plurality of streams spaced about the circumference of the furnace and directed obliquely downwardly in such manner that oxidizing flames generated by said air do not directly contact molten material descending into said chamber.

9. A shaft furnace for carrying the method according to claim 1 into effect, characterized in that the shaft has an upper, narrow portion which widens downwards towards the widest section of the shaft, and that air intakes directly obliquely downwards are arranged in the upper, narrow portion of the shaft at at least two different levels and, at the upper level at least, in the form of slots extending substantially along the whole circumference of the shaft, and that gas off-takes are arranged at a level below the upper, narrow portion of the shaft.

10. A shaft furnace according to claim 9, characterized in that the shaft has an upper, narrow portion which widens downwards towards the widest section of the shaft and a lower portion arranged as a melting chamber having a ceiling in the shape of a frustum of a cone, and that air intakes directed obliquely downwards are arranged in part in the upper, narrow portion of the shaft, in part in the melting chamber, the air intakes in the upper, narrow portion being arranged at at least two different levels and, at the upper level at least, in the form of slots extending substantially along the whole circumference of the shaft, and the air intakes in the melting chamber being arranged in the cone-shaped ceiling in the form of slots extending substantially along the whole circumference of the melting chamber, and that gas off-takes are arranged between the melting chamber and the widest section of the shaft.

11. A shaft furnace according to claim 9, characterized in that it is provided with a device for automatic and gas-tight feeding-in of fuel and possibly material to be melted.

12. A shaft furnace according to claim 9 characterized in that the openings of the gas off-takes in the shaft wall are arranged and directed substantially downwards so that gas formed in the top of the furnace must divert substantially 180° in order to be able to escape through the gas off-takes, whereby a cyclone action of the gas is produced.

13. A shaft furnace according to claim 12, characterized in that the openings of the gas off-takes are arranged where the upper, narrow portion of the shaft widens towards the widest section of the shaft.

14. A shaft furnace according to claim 9, characterized in that the upper, narrow portion of the shaft widens towards a widest section having at least the double cross-section area.

15. A shaft furnace according to claim 10, characterized in that the shaft is shaped between its widest section and the melting chamber like a frustum of a cone with the thick end upwards.

16. A shaft furnace according to claim 9, characterized in that the upper, narrow portion of the shaft is shaped like a frustum of a cone with the thick end downwards.

17. A shaft furnace according to claim 9 intended to be operated as a blast furnace, characterized in that it is provided with a device for feeding fuel in the centre of the shaft and with a device for feeding ore, preferably concentrates, annularly around the fuel.

18. A shaft furnace according to claim 17, characterized in that it is provided with a central tube for the fuel feed, which tube is narrower than the surrounding portion of the top of the furnace so that the fuel can form a free dispose surface, and that the feeding-in device ends close to this free dispose surface whereby the ore fed in will deposit upon the free dispose surface of the fuel and accompany the fuel while the same is descending in the shaft.

References Cited in the file of this patent

UNITED STATES PATENTS

| | | |
|---|---|---|
| 783,044 | Johnson | Feb. 21, 1905 |
| 1,092,168 | Prudhomme | Apr. 7, 1914 |
| 1,467,460 | Vajk | Apr. 3, 1922 |
| 2,732,332 | Geller | Jan. 24, 1956 |
| 2,795,497 | Elvander | June 11, 1957 |